(12) United States Patent
Xu

(10) Patent No.: US 9,965,491 B2
(45) Date of Patent: May 8, 2018

(54) METHOD AND DEVICE FOR RECORDING SYSTEM LOG

(71) Applicant: ZTE Corporation, Shenzhen (CN)

(72) Inventor: Lin Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 351 days.

(21) Appl. No.: 14/762,486

(22) PCT Filed: Sep. 17, 2013

(86) PCT No.: PCT/CN2013/083678
§ 371 (c)(1),
(2) Date: Jul. 22, 2015

(87) PCT Pub. No.: WO2014/114100
PCT Pub. Date: Jul. 31, 2014

(65) Prior Publication Data
US 2015/0363426 A1 Dec. 17, 2015

(30) Foreign Application Priority Data
Jan. 22, 2013 (CN) .......................... 2013 1 0022653

(51) Int. Cl.
*G06F 17/30* (2006.01)

(52) U.S. Cl.
CPC .. *G06F 17/30233* (2013.01); *G06F 17/30286* (2013.01)

(58) Field of Classification Search
CPC ......... G06F 17/30286; G06F 17/30233; G06F 17/30; H04N 21/4345; H04N 21/2183;
(Continued)

(56) References Cited

U.S. PATENT DOCUMENTS 5,530,848 A * 6/1996 Gilbert .................... G06F 9/466
    700/2
5,552,279 A * 9/1996 Weisburg ............... C12Q 1/689
    435/6.12
(Continued)

FOREIGN PATENT DOCUMENTS

CN          101534213 A       9/2009
CN          102024005 A       4/2011
(Continued)

OTHER PUBLICATIONS

International Search Report for corresponding application PCT/CN2013/083678 filed Sep. 17, 2013; dated Dec. 19, 2013.
(Continued)

*Primary Examiner* — Anh Ly
(74) *Attorney, Agent, or Firm* — Cantor Colburn LLP

(57) ABSTRACT

Provided are a method and device for recording a system log. The method includes: acquiring the sequence information of a virtual log file in a system, wherein the virtual log file is a preset file for the system, and the virtual log file includes the sequence information, and the sequence information is used for determining a position of a log file which is written last time by the system; and determining the log file which is written last time by the system according to the sequence information of the virtual log file, and writing the log in the determined log file. By the disclosure, the sequence of system log recording is not influenced by changes in the system time.

4 Claims, 4 Drawing Sheets

Acquiring sequence information of a virtual log file in a system, wherein the virtual log file is a preset file for the system, and the virtual log file includes the sequence information, and the sequence information is used for determining a position of a log file which is written last time by the system — S102

Determining the log file which is written last time by the system according to the sequence information of the virtual log file, and writing the determined log file — S104

(58) Field of Classification Search
CPC .... H04N 21/84; H04W 72/005; H04W 24/01; H04W 24/10; H04W 8/22; H04L 69/22; H04L 45/74; H04L 47/34
See application file for complete search history.

(56) References Cited

U.S. PATENT DOCUMENTS

| | | | | |
|---|---|---|---|---|
| 6,671,821 | B1* | 12/2003 | Castro | G06F 17/30212 707/E17.007 |
| 2004/0243704 | A1* | 12/2004 | Botelho | G06F 17/3089 709/224 |
| 2005/0113070 | A1* | 5/2005 | Okabe | H04W 12/08 455/411 |
| 2005/0262170 | A1* | 11/2005 | Girkar | G06F 17/30575 707/E17.005 |
| 2009/0041380 | A1* | 2/2009 | Watanabe | G06F 21/84 382/276 |
| 2009/0150599 | A1* | 6/2009 | Bennett | G06F 11/1441 711/103 |
| 2009/0276470 | A1 | 11/2009 | Vijayarajan | |
| 2010/0153779 | A1* | 6/2010 | Berry | G06F 11/1438 714/18 |
| 2011/0135094 | A1* | 6/2011 | Muto | H04N 7/163 380/270 |
| 2012/0030172 | A1 | 2/2012 | Pareek | |
| 2012/0042096 | A1* | 2/2012 | Wu | H04L 63/1466 709/238 |
| 2012/0109895 | A1* | 5/2012 | Zwilling | G06F 11/1471 707/648 |

FOREIGN PATENT DOCUMENTS

| | | |
|---|---|---|
| CN | 102467516 A | 5/2012 |
| CN | 103092745 A | 5/2013 |

OTHER PUBLICATIONS

Balakrishnan Mariyappan: "How to: The Ultimate Logrotate Command Tutorial with 10 Examples", Jul. 14, 2010, pp. 1-20, XP055237352.
European Search Report for corresponding application EP13872793: Report dated Jan. 12, 2016.

* cited by examiner

METHOD AND DEVICE FOR RECORDING SYSTEM LOG

TECHNICAL FIELD

The disclosure relates to the data processing field, and in particular to a method and device for recording a system log.

BACKGROUND

In various daily systems, log recording is a means widely used for information recording and fault location. When log files are recorded, a mode of cyclic covering of multiple log files is commonly used. There are multiple log files, and log recording, particularly a recording sequence of logs, should not be influenced by the restart of a system in general when the system is restarted. Therefore, how to determine a correct log file for continuing recording becomes a problem after the system is restarted.

For the above-mentioned problem, solutions in the relate art are as follows:

1) for a system without any requirement on a recording time length of the log files, a capacity of each log file is generally fixed. And after such a system is restarted, the last log file where a log is recorded before restart can be judged according to the capacities of the log files; but however, the method is inapplicable to a system with a requirement on the recording time length of the log files.

2) for the system with the requirement on the recording time length of the log files, the capacity of each log file is unfixed, so the last log file where the log is recorded before restart cannot be judged according to the capacities of the log files. At the moment, timestamps are generally added into names of the log files, so that the last log file where the log is recorded before restart can be determined for continuing recording according to the timestamps after the system is restarted; but a shortcoming of the method is influenced by system time, and once the system time is changed to be earlier, the last recording file cannot be correctly determined after the system is restarted, which further causes the recording sequence disorder of the log files.

For the problem of log file recording sequence disorder caused by the influence of changing of the system time on a log recording process of the system with the requirement on the recording time length of the log files in the related art, none effective solution is provided.

SUMMARY

The embodiments of the disclosure provide a method and device for recording a system log, so as to at least solve the problem in the related that log file recording sequence disorder caused by the influence of changing of system time on a log recording process of a system with a requirement on a recording time length of log files.

In order to solve the above-mentioned problem, provides a method for recording a system log is provided according to one aspect of the disclosure, the method includes the following steps: acquiring sequence information of a virtual log file in a system, wherein the virtual log file is a preset file for the system, and the virtual log file includes the sequence information, and the sequence information is used for determining a position of a log file which is written last time by the system; and determining the log file which is written last time by the system according to the sequence information of the virtual log file, and writing the determined log file.

In an example embodiment, before acquiring the sequence information of the virtual log file in the system, the method further includes: determining a maximum value N of the number of log files required to be reserved in the system according to a requirement of the system on a length of time when a log is written; creating N+1 sequence numbers, recorded as 1, 2 . . . N, N+1 respectively, the sequence numbers corresponding to the log files which are sequentially created, wherein a sequence number of a log file which is created for the first time is 1, a sequence number of a log file which is created for the (N+1)th time is N+1, a sequence number of a log file which is created for the (N+2)th time is 1, and so on; and generating the sequence information of the virtual log file according to the created sequence numbers and a log recording status of a current log file.

In an example embodiment, generating the sequence information of the virtual log file according to the created sequence numbers and the log recording status of the current log file includes: sequentially judging whether or not there is a log recorded under each of the created sequence numbers; and acquiring a minimum sequence number n from sequence numbers under which there are no logs recorded, and generating the sequence information of the virtual log file according to the minimum sequence number n, wherein the sequence information is used for indicating that the position of the log file which is written last time by the system is a log file with a sequence number n−1 is located.

A device for recording a system log is provided according to another aspect of the disclosure, the device includes: an acquisition element, configured to acquire sequence information of a virtual log file in a system, wherein the virtual log file is a preset file for the system, and the virtual log file includes the sequence information, and the sequence information is used for determining a position of a log file which is written last time by the system; and a first determination element, configured to determine the log file which is written last time by the system according to the sequence information of the virtual log file, and write the determined log file.

In an example embodiment, the device further includes: a second determination element, configured to determine a maximum value N of the number of log files required to be reserved in the system according to a requirement of the system on a length of time when a log is written, before acquiring the sequence information of the virtual log file in the system; a creation element, configured to create N+1 sequence numbers, recorded as 1, 2 . . . N, N+1 respectively, the sequence numbers corresponding to log files which are sequentially created, wherein a sequence number of a log file which is created for the first time is 1, a sequence number of a log file which is created for the (N+1)th time is N+1, a sequence number of a log file which is created for the (N+2)th time is 1, and so on; and a generation element, configured to generate the sequence information of the virtual log file according to the created sequence numbers and a log recording status of a current log file.

In an example embodiment, the generation element includes: a judgment component, configured to sequentially judge whether or not there is a log recorded under each of the created sequence numbers; and a generation component, configured to acquire a minimum sequence number n from sequence numbers under which there are no logs recorded, and generate the sequence information of the virtual log file according to the minimum sequence number n, wherein the sequence information is used for indicating that log file which is written last time by the system is a log file with a sequence number n−1 is located.

The disclosure has beneficial effects as follows:

In the embodiments of the disclosure, when system log recording is performed, the sequence information of the virtual log file is acquired at first, the last log recording position in the system is determined according to the sequence information of the virtual log file, and the system is controlled to sequentially continue performing log recording after the last log recording position in the system is determined; and by such a log recording manner, the problem in the related art that log file recording sequence disorder caused by the influence of changing of the system time on the log recording process of the system with the requirement on the recording time length of the log files is effectively solved, and the sequence of system log recording is not influenced by changes in the system time.

DETAILED DESCRIPTION OF EMBODIMENTS

In order to solve the problem in the related art that log file recording sequence disorder caused by the influence of changing of system time on a log recording process of a system with a requirement on a recording time length of log files, a method and device for recording a system log is provided according to the disclosure. The disclosure is described below with reference to the accompanying drawings and embodiments in detail. Note that, the embodiments of the disclosure and the features of the embodiments may be combined with each other if there is no conflict.

Embodiment 1

Figure 1:
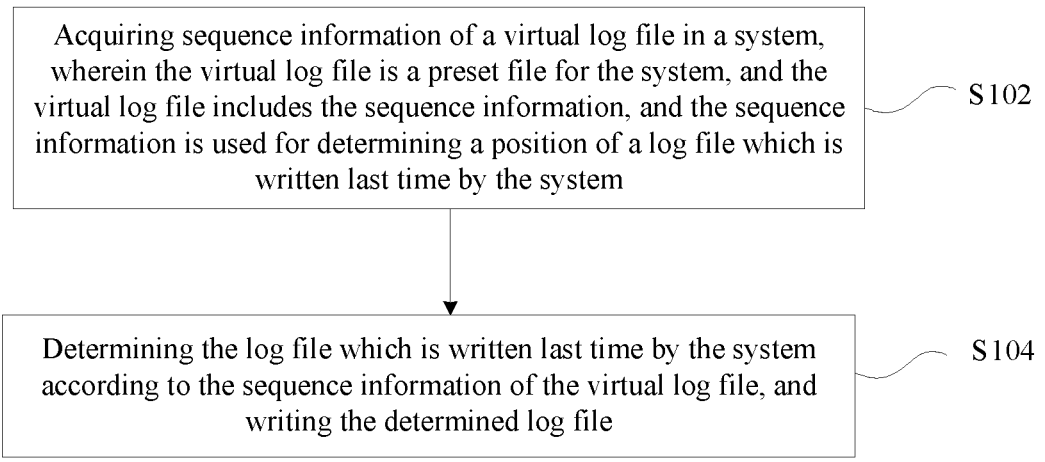
FIG. 1 is a flowchart of a method for recording a system log according to an example embodiment of the disclosure.

A method for recording a system log is provided according to an example embodiment of the disclosure. FIG. 1 is a flowchart of a method for recording a system log according to an example embodiment of the disclosure, and as shown in FIG. 1, the method includes the following steps:

S102: sequence information of a virtual log file in a system is acquired, wherein the virtual log file is a preset file for the system, and the virtual log file includes the sequence information, and the sequence information is used for determining a position of a log file which is written last time by the system; and S104: the log file which is written last time by the system according to the sequence information of the virtual log file is determined, and the determined log file is written.

In the example embodiment, when system log recording is performed, the sequence information of the virtual log file is acquired at first, the last log recording position in the system is determined according to the sequence information of the virtual log file, and the system is controlled to sequentially continue performing log recording after the last log recording position in the system is determined; and by such a log recording manner, the problem in the related art that log file recording sequence disorder caused by the influence of changing of system time on a log recording process of the system with a requirement on a recording time length of the log files is effectively solved, and the sequence of system log recording is not influenced by changes in the system time.

In an example embodiment of the disclosure, the method is also optimized, and specifically, before the sequence information of the virtual log file in the system is acquired, the method further includes: a maximum value N of the number of log files required to be reserved in the system is determined according to the requirement of the system on a length of time when a log is written; N+1 sequence numbers are created, recorded as 1, 2 . . . N, N+1 respectively, the sequence numbers corresponding to log files which are sequentially created; and the sequence information of the virtual log file is generated according to the created sequence numbers and a log recording status of a current log file.

For example, if the system requires the reservation of log records of three days with one log file for one day, it can be determined that the maximum number N of the log files required to be reserved in the system is 3, and after N is determined, the sequence numbers are created. Specifically, the number of the created sequence numbers is N+1=4, i.e. 1, 2, 3 and 4 respectively. The four sequence numbers correspond to the log files which are sequentially created, that is, a sequence number corresponding to a log file which is created by the system on the first day is 1, a sequence number corresponding to a log file which is created by the system on the second day is 2, a sequence number corresponding to a log file which is created by the system on the third day is 3; and because the system only requires the reservation of the log records of three days, a sequence number corresponding to a log file which is created by the system on the fourth day is 4, then the log file which is created on the first day and corresponds to the sequence number 1 is cleared, a sequence number corresponding to a log file which is created by the system on the fifth day is 1, the log file which is created on the second day and corresponds to the sequence number 2 is cleared, and so on. After the creation of the sequence numbers is finished, log recording statuses (whether or not there are recorded logs) in the log files corresponding to the sequence number 1, the sequence number 2, the sequence number 3 and the sequence number 4 are sequentially judged, and the sequence information of the virtual log file is generated according to a judgment result.

In addition, the disclosure also provides an example scheme for generating the sequence information of the virtual log file, and specifically, the scheme includes the following steps: whether or not there is a log recorded under each of the created sequence numbers is sequentially judged; and a minimum sequence number n is acquired from the sequence numbers under which there are no logs recorded, and the sequence information of the virtual log file is generated according to the minimum sequence number n, wherein the sequence information is used for indicating that the log file which is written last time by the system is a log file with a sequence number n−1 is located.

Embodiment 2

Figure 2:
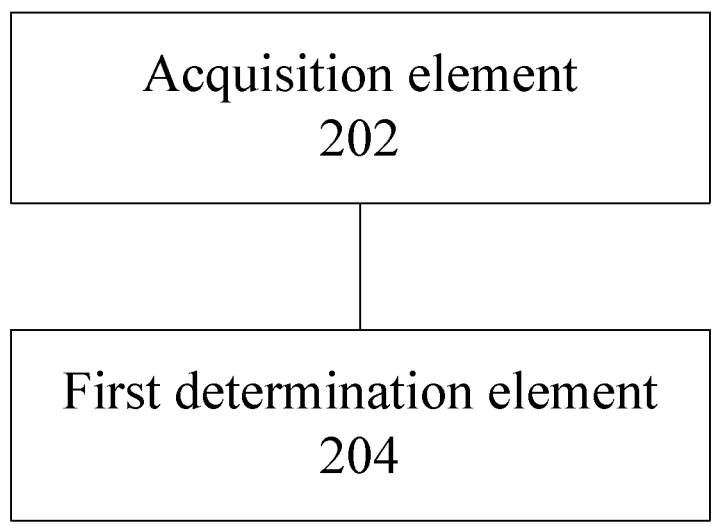
FIG. 2 is a structural diagram of a device for recording a system log according to an example embodiment of the disclosure.

Based on the method for recording a system log provided by embodiment 1, the example embodiment provides a device for recording a system log. FIG. 2 is a structural diagram of the device for recording a system log according to an example embodiment of the disclosure, and as shown in FIG. 2, the device includes: an acquisition element 202, configured to acquire the sequence information of a virtual log file in a system, wherein the virtual log file is a preset file for the system, and the virtual log file includes the sequence information, and the sequence information is used for determining a position of a log file which is written last time by the system; and a first determination element 204, connected to the acquisition unit 20 and configured to determine the log file which is written last time by the system according to the sequence information of the virtual log file, and write the determined log file.

In the example embodiment, when system log recording is performed, the sequence information of the virtual log file is acquired at first, the last log recording position in the system is determined according to the sequence information of the virtual log file, and the system is controlled to sequentially continue performing log recording after the last log recording position in the system is determined; and by such a log recording manner, the problem in the related art that log file recording sequence disorder caused by the influence of changing of system time on a log recording process of the system with a requirement on a recording time length of the log files in the prior art is effectively solved, and the sequence of system log recording is not influenced by changes in the system time.

Figure 3:
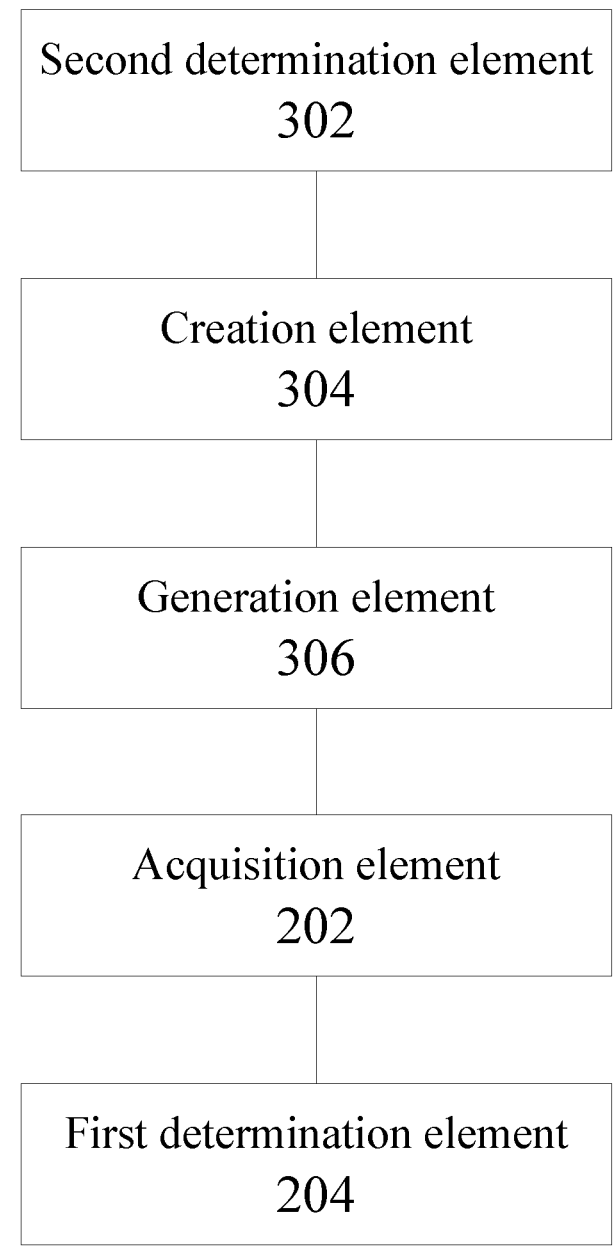
FIG. 3 is a structural diagram of a device for recording a system log according to another example embodiment of the disclosure.

In an example embodiment of the disclosure, the device is also optimized, and specifically, as shown in FIG. 3, the device further includes: a second determination element 302, configured to determine a maximum value N of the number of log files required to be reserved in the system according to the requirement of the system on a length of time when a log is written, before acquiring the sequence information of the virtual log file in the system; a creation element 304, connected to the second determination element 302 and configured to create N+1 sequence numbers, recorded as 1, 2 . . . N, N+1 respectively, the sequence numbers corresponding to the log files which are sequentially created, wherein a sequence number of a log file which is created for the first time is 1, a sequence number of a log file which is created for the (N+1)th time is N+1, a sequence number of a log file which is created for the (N+2)th time is 1, and so on; and a generation element 306, connected to the creation element 304 and configured to generate the sequence information of the virtual log file according to the created sequence numbers and a log recording status of a current log file.

For example, if the system requires the reservation of log records of three days with one log file for one day, it can be determined that the maximum number N of the log files required to be reserved in the system is 3, and after N is determined, the sequence numbers are created. Specifically, the number of the created sequence numbers is N+1=4, i.e. 1, 2, 3 and 4 respectively. The four sequence numbers correspond to the log files which are sequentially created, that is, a sequence number corresponding to a log file which is created by the system on the first day is 1, a sequence number corresponding to a log file which is created by the system on the second day is 2, a sequence number corresponding to a log file which is created by the system on the third day is 3; and because the system only requires the reservation of the log records of three days, a sequence number corresponding to a log file which is created by the system on the fourth day is 4, then the log file which is created on the first day and corresponds to the sequence number 1 is cleared, a sequence number corresponding to a log file which is created by the system on the fifth day is 1, the log file which is created on the second day and corresponds to the sequence number 2 is cleared, and so on. After the creation of the sequence numbers is finished, log recording statuses (whether or not there are recorded logs) in the log files corresponding to the sequence number 1, the sequence number 2, the sequence number 3 and the sequence number 4 are sequentially judged, and the sequence information of the virtual log file is generated according to a judgment result.

Figure 4:
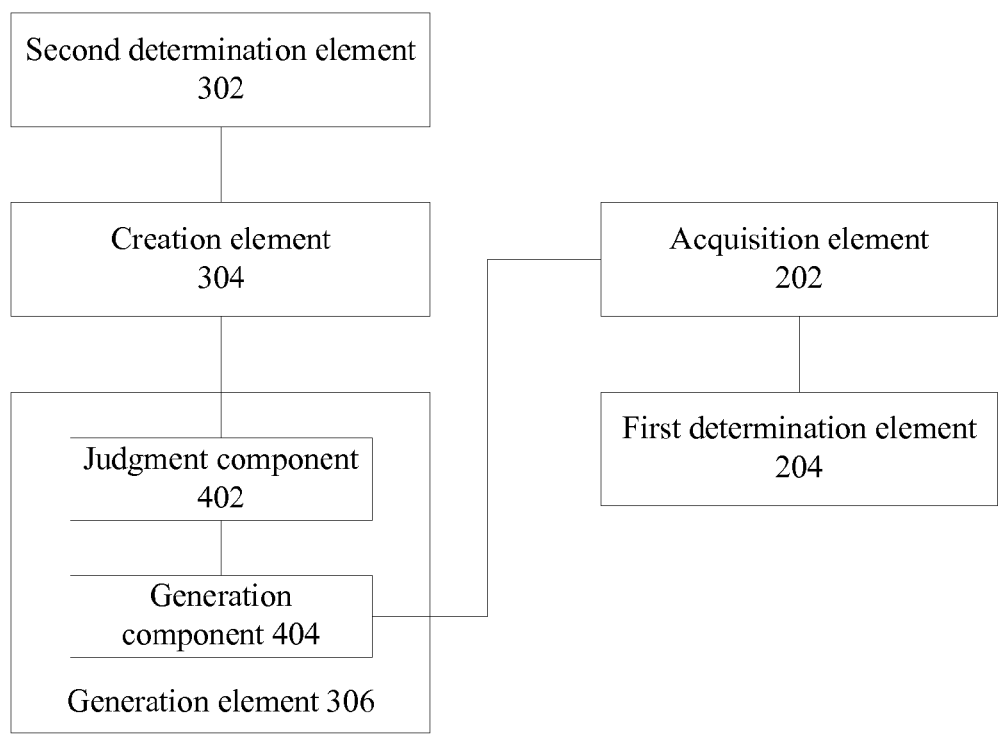
FIG. 4 is a structural diagram of a device for recording a system log according to another example embodiment of the disclosure.

In addition, the disclosure also provides an example scheme for generating the sequence information of the virtual log file, and specifically, as shown in FIG. 4, the generation element 306 includes: a judgment component 402, configured to sequentially judge whether or not there is a log recorded under each of the created sequence numbers; and a generation component 404, connected to the judgment component 402 and configured to acquire a minimum sequence number n from the sequence numbers under which there are no logs recorded, and generate the sequence information of the virtual log file according to the minimum sequence number n, wherein the sequence information is used for indicating that the log file which is written last time by the system is a log file with a sequence number n−1.

Embodiment 3

Based on the method for recording a system log provided by embodiment 1 and the device for recording a system log provided by embodiment 2, the example embodiment provides another method for recording a system log. In an example embodiment, a virtual log file occupies a sequence number, the sequence number occupied by the virtual log file can be used as the sequence information of the virtual log file, and the sequence number dynamically changes along with changes in statuses of logs in log files in a system, and a position of a last log file where the log is recorded in the system is determined according to the sequence number. Specific description is given below.

If the system requires the reservation of log records of the last X days with one log file for one day, a set sequence number value range is [1, (X+1)], wherein (X+1) sequence numbers correspond to X log files and a virtual log file respectively. Here, it is important to note that the virtual log file does not actually exist, and can be a logically existing file only occupying the sequence number, and during specific implementation, the virtual log file can also be a null file or exist in form of another file with a fixed characteristic as long as the virtual log file can be distinguished from one or more normal files.

The searching algorithm of the sequence number of the virtual log file is as follows: a directory of the log records is traversed, whether or not the log file corresponding to the sequence number exists is sequentially judged from a sequence number 2 to a sequence number (X+1), and if a log file corresponding to a sequence number does not exist, it is determined that the sequence number is occupied by the virtual log file (that is, the sequence number of the virtual log file is the sequence number). If the log files corresponding to the sequence number 2 to the sequence number (X+1) all exist, the sequence number of the virtual log file is 1. In any running time bucket of the system, such an algorithm can be used for calculating the sequence number of the virtual log file at that moment.

Specifically, the method includes the following steps:

Step 1: the system is started, the searching algorithm of the sequence number of the virtual log file is used for determining a sequence number VIXdex of the virtual log file at first. In an example embodiment, if there is no log file under a log directory, the obtained sequence number VIXdex of the virtual log file is 2. Then, a sequence number CIXdex of a current log file is calculated according to formula CIXdex=(VIXdex−1)% (X+1), where % is remainder calculation operation. Finally, the log is recorded in the log file with the sequence number CIXdex. If not existing, the log file with the sequence number CIXdex is generated. In an example embodiment, if there is no log file in the log directory, the obtained sequence number CIXdex of the current recording log file is 1, that is, if there is no log file when the system is started, the logs are recorded from the log file with a sequence number 1.

Step 2: after one day, system time and date are discovered to be changed when logs are recorded, the recording of the current log file is ended, and the current log file is switched. In an example embodiment, a sequence number CIXdex' of a log file to which the current log file is required to be switched is calculated according to formula CIXdex'=(CIXdex+1)% (X+1). Then, whether or not the log file with the sequence number CIXdex' exists is judged, and if existing, the log file with the sequence number CIXdex' is deleted at first, and another log file with the sequence number CIXdex' is generated for log recording.

Step 3: Step 2 is repeated until the system is restarted.

Step 4: Step 1 to Step 3 are repeated.

Figure 5:
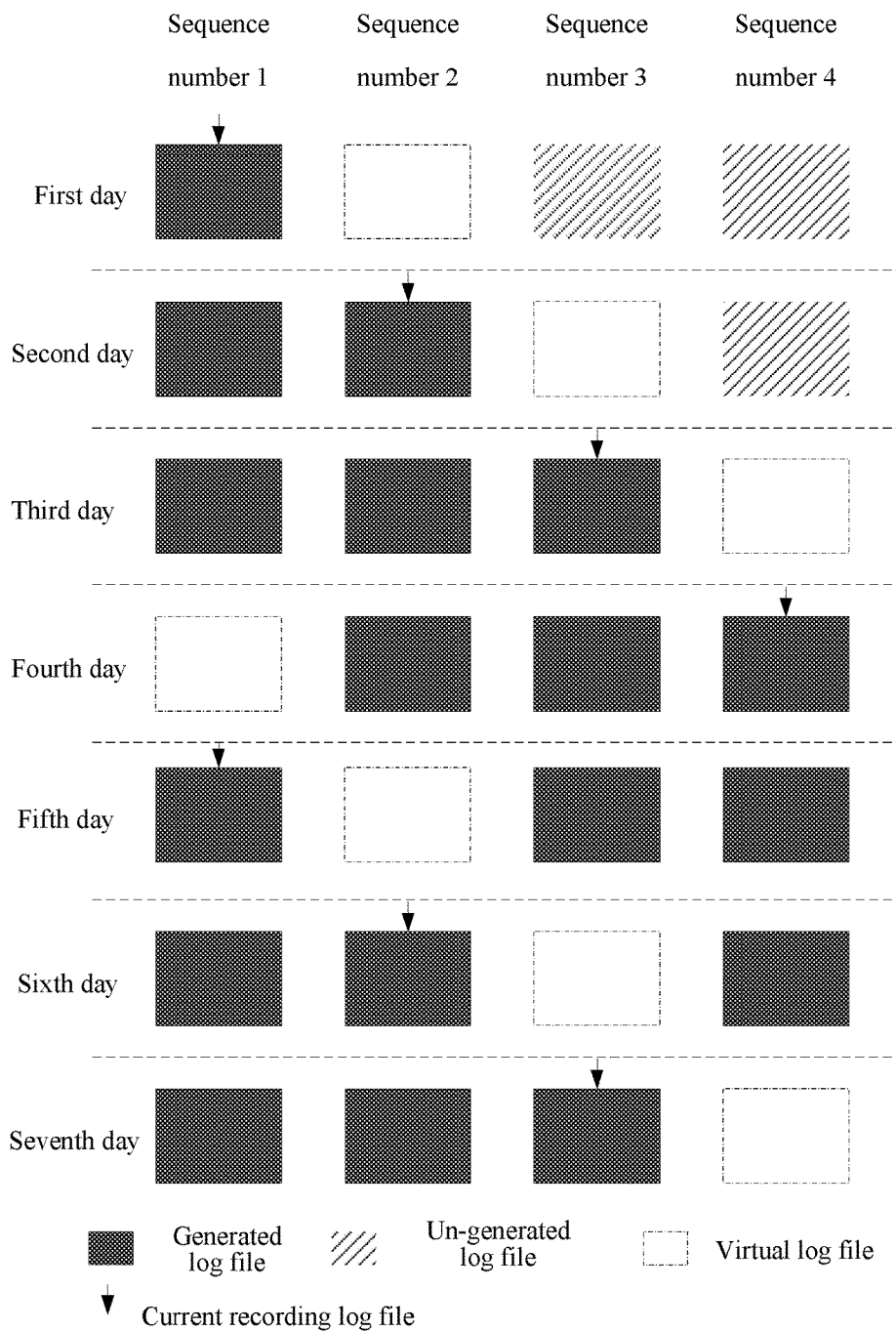
FIG. 5 is a processing schematic diagram of the reservation of log records in the last three days in the system according to an embodiment of the disclosure.

As shown in FIG. 5, the process of the method is specifically described by taking X=3 as an example. On the first day, a log is recorded by the system in a log file with a sequence number 1, and the sequence number of the virtual log file is 2; on the second day, a log is recorded by the system in a log file with a sequence number 2, and the sequence number of the virtual log file is 3; and so on.

From the above, the disclosure has the advantages as follows: 1, the requirement of the system on the recording time length of the log files can be met; and 2, when the system time is changed, the recording sequence of the log files can still be ensured.

INDUSTRIAL APPLICABILITY

From the above, the method and device for recording a system log provided by the embodiments of the disclosure have the beneficial effects as follows: when system log recording is performed, the sequence information of the virtual log file is acquired at first, the last log recording position in the system is determined according to the sequence information of the virtual log file, and the system is controlled to sequentially continue performing log recording after the last log recording position in the system is determined, so that the sequence of system log recording is not influenced by changes in the system time.

Although the example embodiments of the disclosure have been disclosed for the aims in the embodiments, those skilled in the art should realize that the disclosure can have various improvements, additions and replacements. Therefore, the embodiments are not intended to limit the scope of the disclosure.

What is claimed is:

1. A control method for recording a system log, comprising:

acquiring sequence information of a virtual log file in a system, wherein the virtual log file is a preset file for the system, and the virtual log file comprises the sequence information, and the sequence information is used for determining a position of a log file which is written last time by the system; and determining the log file which is written last time by the system according to the sequence information of the virtual log file, and writing the determined log file;

wherein before acquiring the sequence information of the virtual log file in the system, the method further comprises:

determining a maximum value N of the number of log files required to be reserved in the system according to a requirement of the system on a length of time when a log is written;

creating N+1 sequence numbers, recorded as 1, 2 . . . N, N+1 respectively, the sequence numbers corresponding to log files which are sequentially created, wherein a sequence number of a log file which is created for the first time is 1, a sequence number of a log file which is created for the (N+1)th time is N+1, a sequence number of a log file which is created for the (N+2)th time is 1, and so on; and generating the sequence information of the virtual log file according to the created sequence numbers and a log recording status of a current log file.

2. The method according to claim 1, wherein generating the sequence information of the virtual log file according to the created sequence numbers and the log recording status of the current log file comprises:

sequentially judging whether or not there is a log recorded under each of the created sequence numbers; and acquiring a minimum sequence number n from sequence numbers under which there are no logs recorded, and generating the sequence information of the virtual log file according to the minimum sequence number n, wherein the sequence information is used for indicating that the log file which is written last time by the system is a log file with a sequence number n−1.

3. A control device for recording a system log, which comprises a hardware processor and a memory, and the hardware processor is configured to execute programming elements stored in the memory, the programming elements comprising:

an acquisition element configured to acquire sequence information of a virtual log file in a system, wherein the virtual log file is a preset file for the system, and the virtual log file comprises the sequence information, and the sequence information is used for determining a position of a log file which is written last time by the system; and a first determination element configured to determine the log file which is written last time by the system according to the sequence information of the virtual log file, and write the determined log file;

a second determination element configured to determine a maximum value N of the number of log files required to be reserved in the system according to a requirement of the system on a length of time when a log is written, before acquiring the sequence information of the virtual log file in the system;

a creation element configured to create N+1 sequence numbers, recorded as 1, 2 . . . N, N+1 respectively, the sequence numbers corresponding to log files which are sequentially created; and a generation element configured to generate the sequence information of the virtual log file according to the created sequence numbers and a log recording status of a current log file.

4. The device according to claim 3, wherein the generation element comprises:
a judgment component configured to sequentially judge whether or not there is a log recorded under each of the created sequence numbers; and
a generation component configured to acquire a minimum sequence number n from sequence numbers under which there are no logs recorded, and generate the sequence information of the virtual log file according to the minimum sequence number n, wherein the sequence information is used for indicating that the log file which is written last time by the system is a log file with a sequence number n−1.

* * * * *